US012570005B2

(12) United States Patent
Bächler et al.

(10) Patent No.: US 12,570,005 B2
(45) Date of Patent: Mar. 10, 2026

(54) GRIPPER ARRANGEMENT FOR COMPONENT PLACEMENT ON MOUNTING PLATES IN SWITCHGEAR AND CONTROL SYSTEM MANUFACTURING

(71) Applicant: RITTAL GMBH & CO. KG, Herborn (DE)

(72) Inventors: Andreas Michael Bächler, Haiger (DE); Lars-Erik Reder, Giessen (DE)

(73) Assignee: RITTAL GMBH & CO. KG, Herborn (DE)

( * ) Notice: Subject to any disclaimer, the term of this patent is extended or adjusted under 35 U.S.C. 154(b) by 1048 days.

(21) Appl. No.: 17/637,968

(22) PCT Filed: Aug. 13, 2020

(86) PCT No.: PCT/DE2020/100705
§ 371 (c)(1),
(2) Date: Feb. 24, 2022

(87) PCT Pub. No.: WO2021/037305
PCT Pub. Date: Mar. 4, 2021

(65) Prior Publication Data
US 2022/0274266 A1     Sep. 1, 2022

(30) Foreign Application Priority Data

Aug. 29, 2019     (DE) ..................... 10 2019 123 241.4
Jul. 9, 2020     (DE) ..................... 10 2020 118 136.1

(51) Int. Cl.
*B25J 15/00*     (2006.01)
*B25J 15/02*     (2006.01)

(52) U.S. Cl.
CPC ....... *B25J 15/0033* (2013.01); *B25J 15/0253* (2013.01)

(58) Field of Classification Search
CPC .......................... B25J 15/0033; B25J 15/0253
See application file for complete search history.

(56) References Cited

U.S. PATENT DOCUMENTS 7,604,584 B1 *  10/2009  Wu ..................... B23Q 3/1554
                                                    483/902
9,695,019 B1 *  7/2017  Huang ..................... B66C 1/22
(Continued)

FOREIGN PATENT DOCUMENTS

CN        109093636  A      12/2018
DE         20115768  U1      2/2003
(Continued)

OTHER PUBLICATIONS

International Search Report (English and German) and Written Opinion (German) issued in PCT/DE2020/100705, mailed Mar. 15, 2021; ISA/EP.
(Continued)

*Primary Examiner* — Stephen A Vu
(74) *Attorney, Agent, or Firm* — Harness, Dickey & Pierce, P.L.C.

(57)                ABSTRACT

A gripper arrangement for component placement on mounting plates in switchgear and control system construction, the gripper arrangement having two gripper jaws whose distance from one another can be adjusted by means of a linear adjusting unit, wherein the gripper jaws each have at least one projection at the end on their outer sides facing away from one another.

14 Claims, 11 Drawing Sheets

(56) References Cited

U.S. PATENT DOCUMENTS

Figure 1:
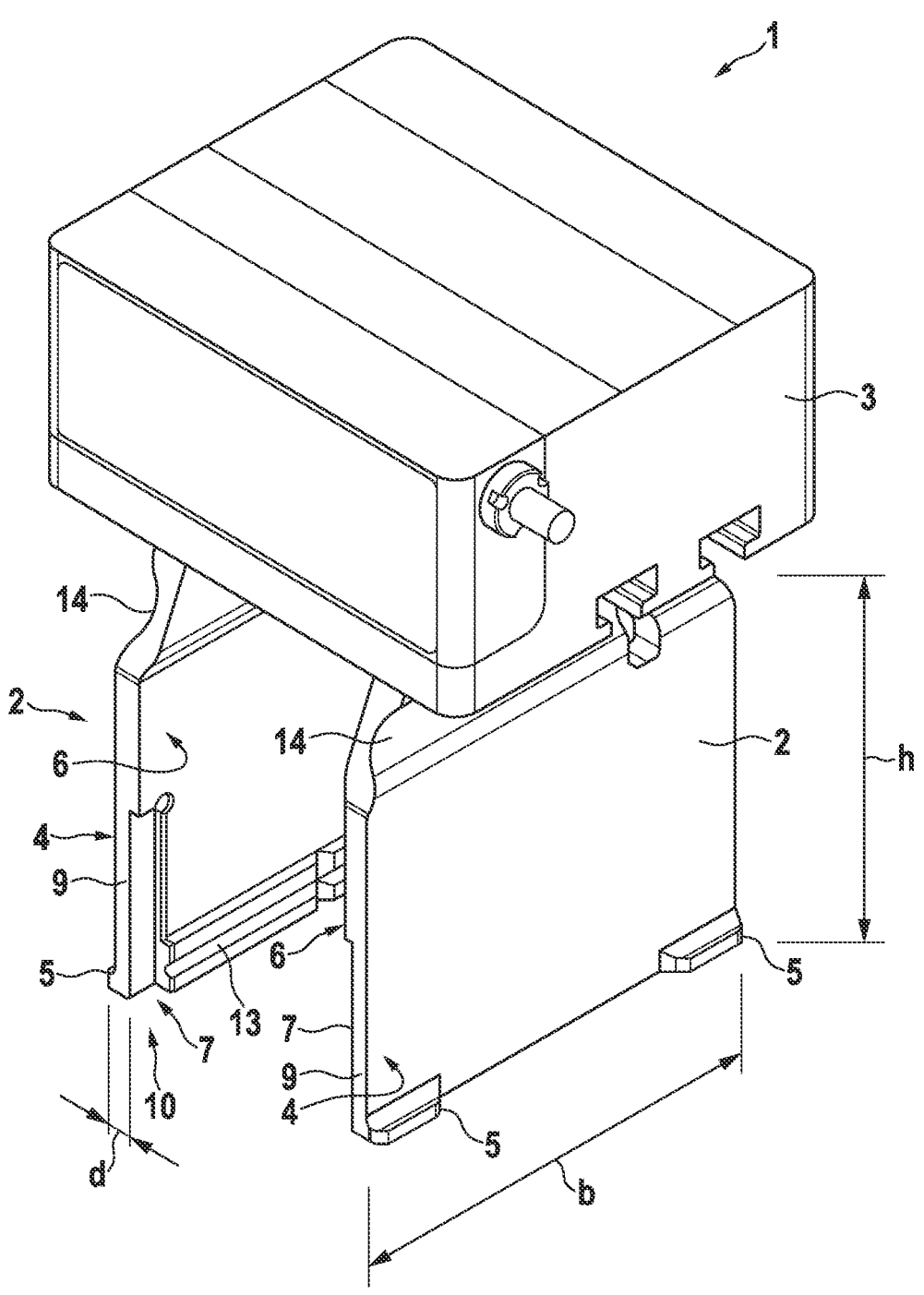

| | | | |
|---|---|---|---|
| 9,868,219 B1 * | 1/2018 | Su ........................ B25J 15/0028 | |
| 10,556,338 B1 * | 2/2020 | Marchese ............ B25J 15/0475 | |
| 2014/0102239 A1 | 4/2014 | Umeno | |
| 2015/0151434 A1 | 6/2015 | Umeno | |
| 2019/0126493 A1 | 5/2019 | Jonas et al. | |

FOREIGN PATENT DOCUMENTS

| | | | |
|---|---|---|---|
| DE | 10 2009 017 999 A1 | 5/2010 | |
| DE | 10 2015 102 968 A1 | 9/2016 | |
| DE | 102016103516 A1 | 8/2017 | |
| DE | 10 2016 005 002 A1 | 10/2017 | |
| DE | 102016004924 A1 | 10/2017 | |
| DE | 102016111893 A1 | 2/2018 | |
| DE | 10 2016 225 203 A1 | 6/2018 | |
| DE | 11 2018 005 221 T5 | 6/2020 | |
| EP | 1033800 A1 | 9/2000 | |
| WO | WO-2010057769 A1 | 5/2010 | |
| WO | WO-2013002269 A1 | 1/2013 | |

OTHER PUBLICATIONS

German International Preliminary Report on Patentability issued in PCT/DE2020/100705, dated Aug. 23, 2021.

* cited by examiner

GRIPPER ARRANGEMENT FOR COMPONENT PLACEMENT ON MOUNTING PLATES IN SWITCHGEAR AND CONTROL SYSTEM MANUFACTURING

CROSS-REFERENCE TO RELATED APPLICATIONS

This application is a U.S. National Phase Application under 35 U.S.C. 371 of International Application No. PCT/DE2020/100705, filed on Aug. 13, 2020, which claims the benefit of German Patent Application No. 10 2019 123 241.4, filed on Aug. 29, 2019, and German Patent Application No. 10 2020 118 136.1, filed on Jul. 9, 2020. The entire disclosures of the above applications are incorporated herein by reference.

BACKGROUND

This section provides background information related to the present disclosure which is not necessarily prior art.

Technical Field

The invention is based on a gripper arrangement for component placement on mounting plates in switchgear and control system manufacturing, wherein the gripper arrangement has two gripper jaws whose distance from one another can be adjusted via a linear adjustment unit. Such a gripper arrangement is known from DE 10 2016 111 893 A1.

Discussion

The known gripper arrangements encounter the problem that in switchgear and control system manufacturing a large variety of very different components with widely varying dimensions and mechanical strengths have to be processed, for example cable ducts on the one hand and profile and mounting rails as well as various assembly components such as terminal blocks on the other. In order to be able to react to this large number of components to be assembled, it has therefore been necessary up to now to provide several gripper arrangements of the type described at the beginning or to change the gripper jaws in the course of the component assembly of the mounting plate in order to be able to react to the respective dimensions and mechanical strengths of the components to be assembled.

SUMMARY

This section provides a general summary of the disclosure, and is not a comprehensive disclosure of its full scope or all of its features.

It is therefore one aspect of the invention to further develop a gripper arrangement of the type described at the outset in such a way that it is suitable for a large number of different components in switchgear and control system construction and, in particular, permits both the processing of parts which are flexible in bending, such as cable ducts, and the processing of assembly components, such as profile and mounting rails, terminal blocks, electrical switching and control components and the like.

Accordingly, in a gripper arrangement of the type described at the beginning, it is provided that the gripper jaws each have at least one projection at the end on their outer sides facing away from each other.

By using gripper plates of the type described above, it is possible, on the one hand, to clamp and maneuver mechanically fixed components such as mounting rails, electrical components of switchgear and control system construction and the like between the facing inner sides of the gripper jaws in a known manner. On the other hand, the plate-shaped gripper jaws with their projections arranged on the opposing outer sides allow even flexible parts such as cable ducts to be conveyed safely, for example by bringing the gripper jaws into contact with the opposing inner sides of the cable duct over their entire surface or at least a partial surface via their outer sides facing away from each other, thereby stabilizing the cable duct on the one hand due to their plate-shaped geometry, while they can engage in the cable duct with their end projections in order to fix the cable duct to the gripper arrangement.

A linear adjusting unit in the sense of the invention can be or have any kinematics, preferably motor-driven, which permits linear adjustment of the gripper jaws relative to one another. For this purpose, the linear adjustment unit does not necessarily have to have a linear actuator. For example, the linear actuator unit can have an angular gripper, a swivel gripper or a radial gripper.

A cable duct of the type described above can in particular be a wiring duct of rectangular cross-section commonly used in switchgear and controlgear construction, which for example comprises essentially a closed bottom side and fingers extending vertically therefrom and forming the opposite side walls of the cable duct, so that a cable or other conductor can be inserted into or led out of the cable duct between adjacent fingers. At the free ends, the fingers often have a latching contour to releasably secure a cover of the cable channel. Such a cable duct is known, for example, from DE 201 15 768 U1.

Preferably, the gripper jaws are plate-shaped and have a thickness in the direction of adjustment of the gripper jaws relative to each other that is substantially less than a width and a height of the gripper jaws perpendicular to each other and perpendicular to the thickness, the thickness preferably being less than $\frac{1}{5}$ and more preferably than $\frac{1}{10}$ of at least one of the height and the width.

The gripper arrangement can further comprise a cable duct, for example a cable duct of the type described above, which has a longitudinal groove on the bottom side of each of its opposing inside longitudinal sides, wherein the gripper jaws dip into the cable duct from an upper side of the cable duct and engage in the longitudinal grooves with their projections on their outer sides facing away from each other.

At least one of the gripper jaws can have a recess on its inner side facing the respective opposite gripper jaw, which recess is open towards an end face and/or towards a longitudinal side of the gripper jaw. Preferably, both gripper jaws have the contoured recess and, particularly preferably, the contoured recess in both gripper jaws is open both to the end face and to the longitudinal side of the respective gripper jaw.

The recess can be arranged in an end corner of the gripper jaw and open into it, the recess being open in the region of the corner without interruption both to the end face and to the longitudinal side of the gripper jaw.

The gripper jaws may have at least one pair of opposing identical recesses on their inner sides facing the respective opposing gripper jaw.

The gripper arrangement can further comprise a placement component, for example a terminal block, which engages with at least one of its opposite end sides in a recess on the inner side of at least one of the gripper jaws. Preferably, the placement component engages with its opposite end sides in a recess on each of the two inner sides of the two gripper jaws.

For example, it can be provided that the placement component protrudes from the recess with its end sides engaging in the recess via the end face and/or the longitudinal side of the gripper jaw. In this case, the placement component can protrude from the recess with an assembly side, via which it can be fixed to a base. For example, if the component to be fitted is a terminal block, the terminal block can protrude from the recess with its latching receptacle for latching onto a top-hat rail or the like, so that automated fitting of top-hat rails with terminal blocks and possibly other components to be fitted is possible with the aid of the described gripper arrangement.

The placement component can rest against at least one stop formed by a rim of the recess, the recess preferably having a rim extending in the width direction of the gripper jaw and forming a height stop and/or a rim extending in the height direction and forming a side stop. The stops may extend perpendicular to each other. Alternatively or additionally, the stops can merge into one another in a corner region.

At least one of the gripper jaws can have a groove on its inner side facing the respective opposite gripper jaw, which groove extends along an end face of the gripper jaw. The groove can open into a recess on an inner side of the gripper jaws facing the respective opposite gripper jaw. The groove on the inner side of the gripper jaws can serve in particular to receive placement components that have a free edge on at least one of two opposite outer sides, via which the component can engage in the groove. Such a placement component can be a folded or otherwise formed sheet metal part, for example a top-hat rail, such as is commonly used in switchgear and controlgear construction, for example for mounting terminal blocks and other placement components for switchgear and controlgear construction.

Accordingly, in one embodiment of the invention, the gripper assembly may further comprise a channel- or rail-shaped placement component, for example, a support rail, a top-hat rail, a cable channel or a cable channel cover, which engage with longitudinal edges facing away from and parallel to each other in a respective groove on the opposing and facing inner sides of the gripper jaws.

At their end facing the linear adjustment unit, the gripper jaws can have a trough on their outer sides facing away from each other, which preferably has the geometry of a concave groove and extends along the width of the respective gripper jaw. The trough can be designed in particular for the form-fitting accommodation of a fastening contour of a flexible component, for example a cable duct.

Thus, in one embodiment of the invention, it is provided that the gripper assembly further comprises a cable channel whose parallel longitudinal sides are formed by a plurality of fingers extending from the bottom of the cable channel and having a bead-shaped contour at their free end on the inner side of the cable channel. In this case, the gripper jaws can dip into the cable duct from an upper side of the cable duct and the fingers with the bead-shaped contour can engage in the troughs on the outer sides of the gripper jaws facing away from each other.

Further areas of applicability will become apparent from the description provided herein. The description and specific examples in this summary are intended for purposes of illustration only and are not intended to limit the scope of the present disclosure.

4

DRAWINGS

The drawings described herein are for illustrative purposes only of selected embodiments and not all possible implementations, and are not intended to limit the scope of the present disclosure.

Figure 2:
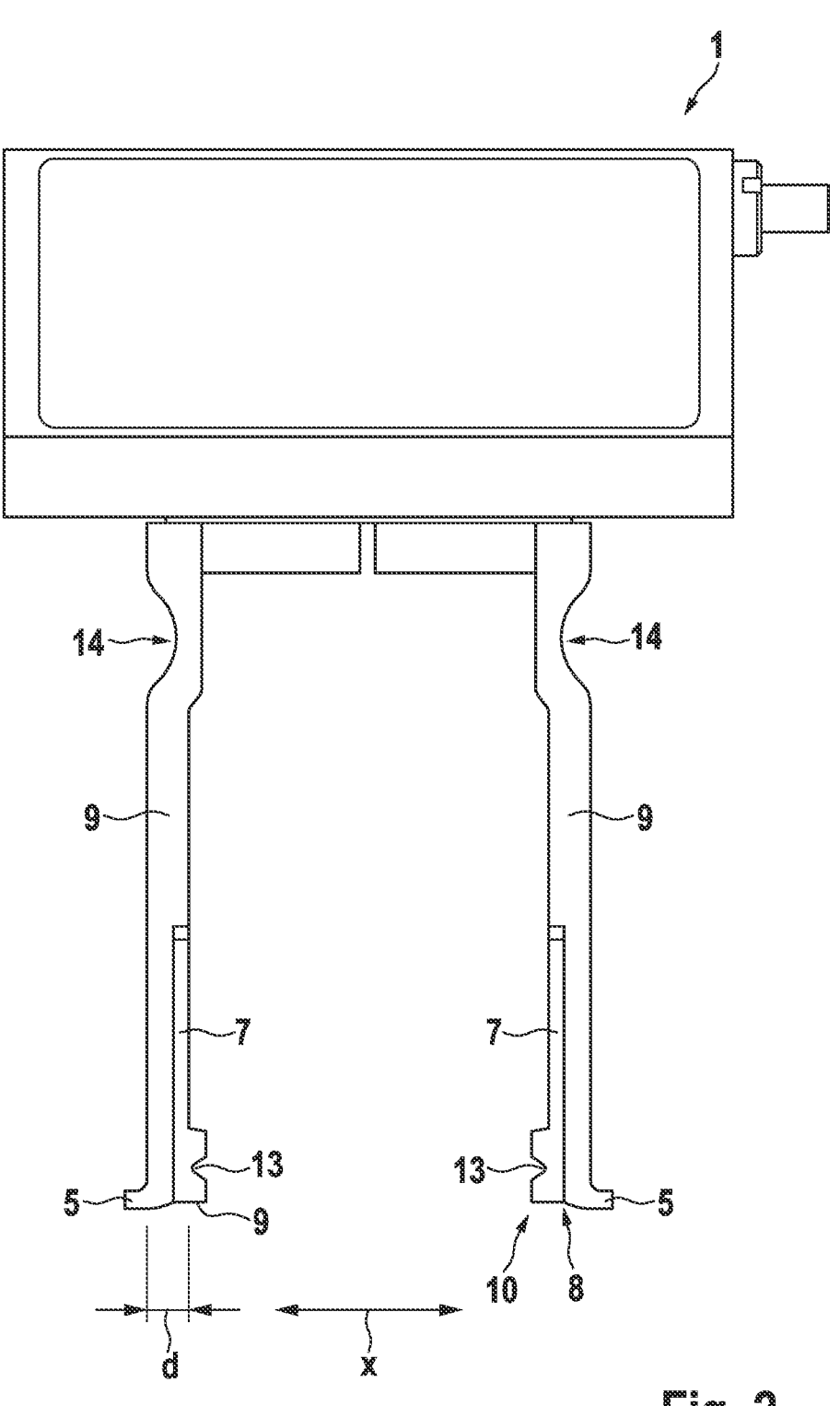
Figure 3:
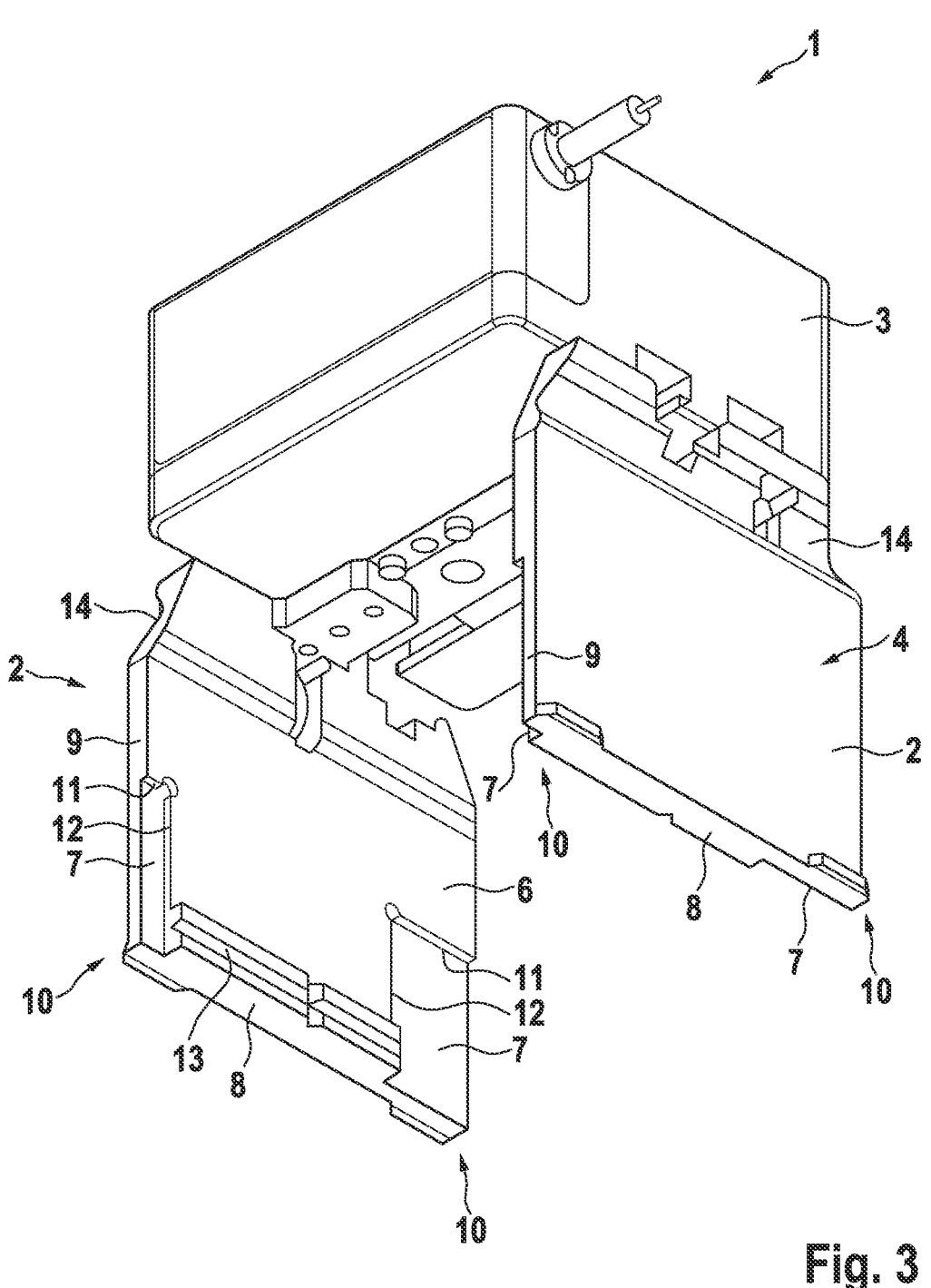
Figure 4:
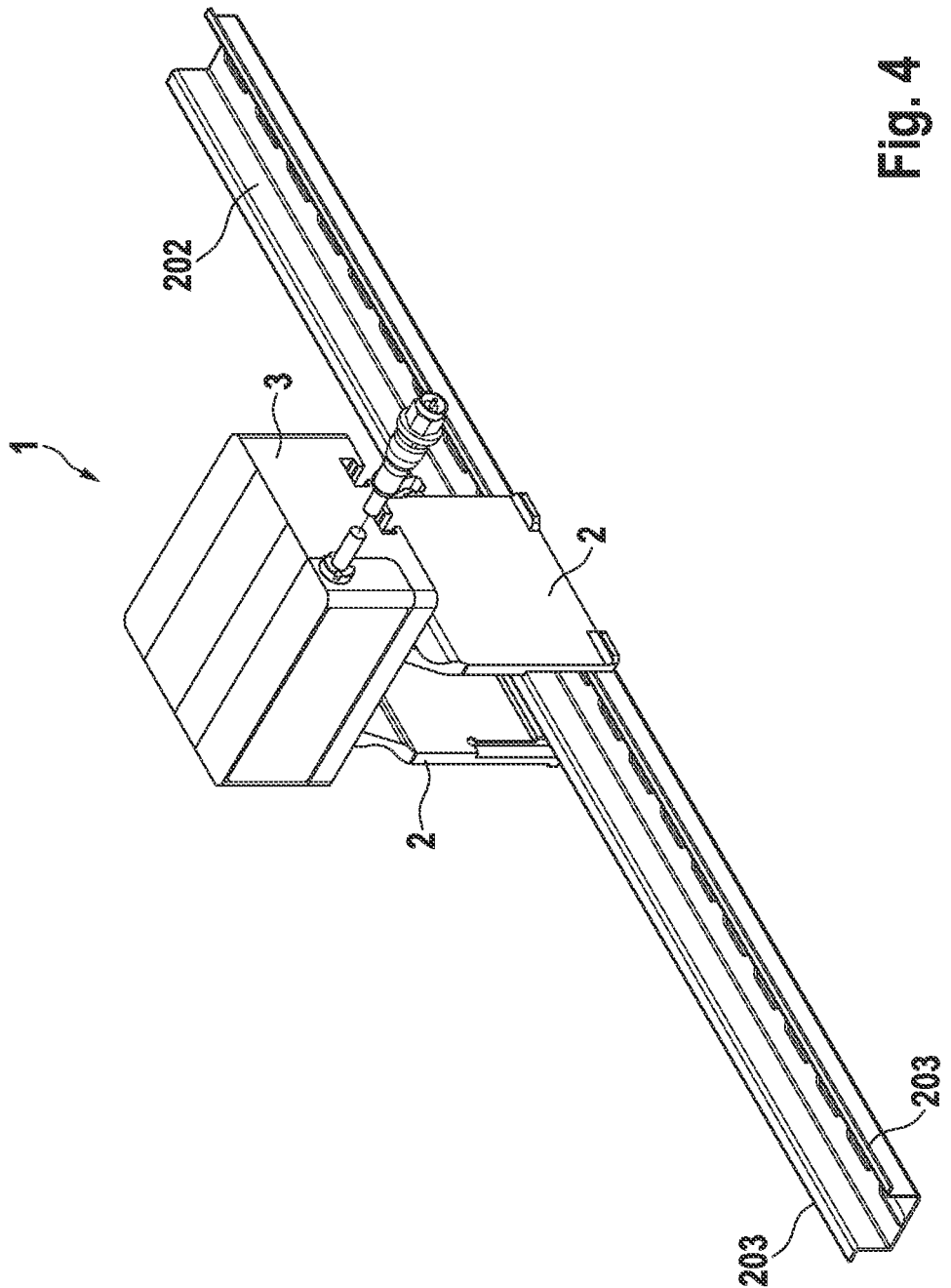
Figure 5:
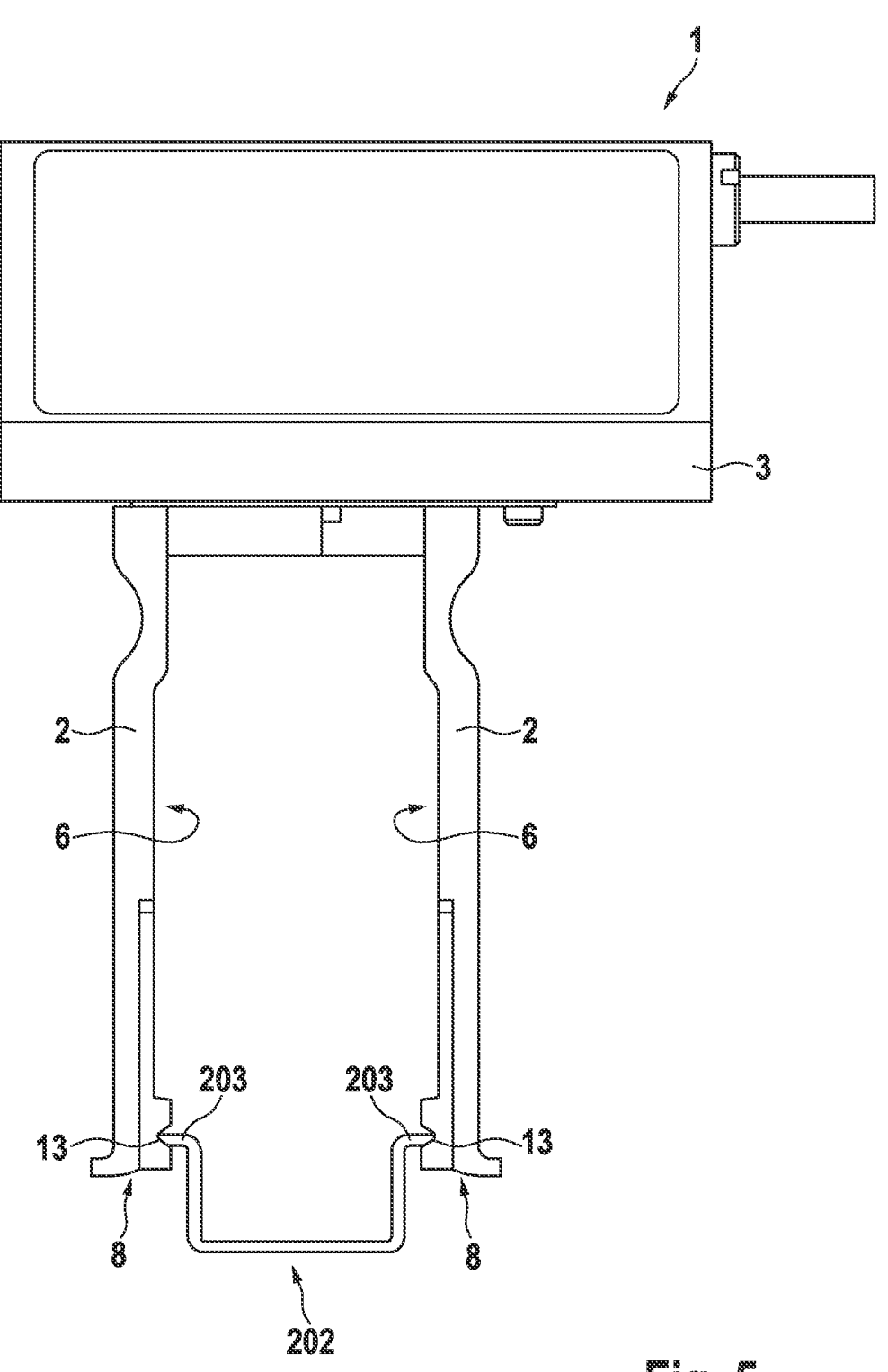
Figure 6:
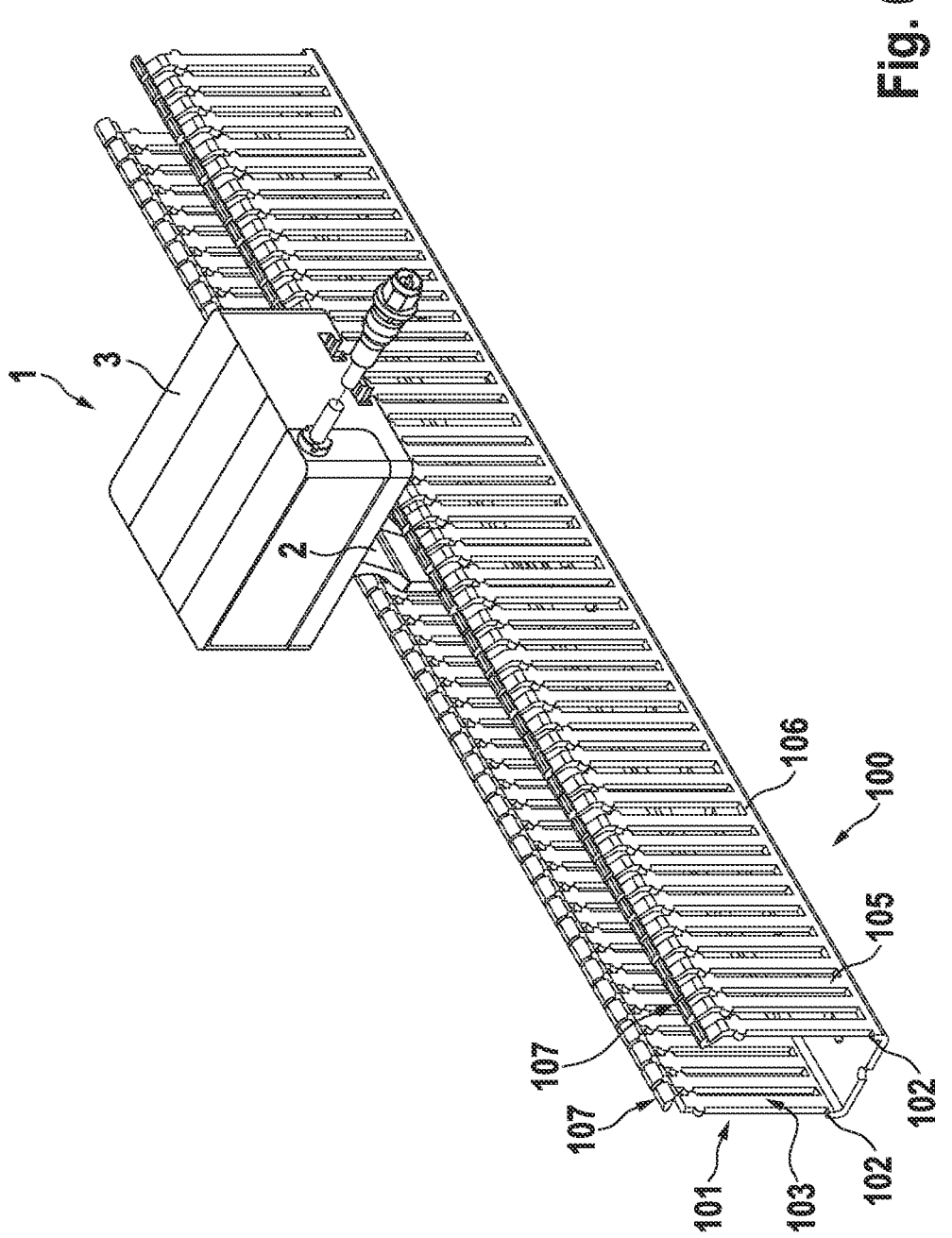
Figure 7:
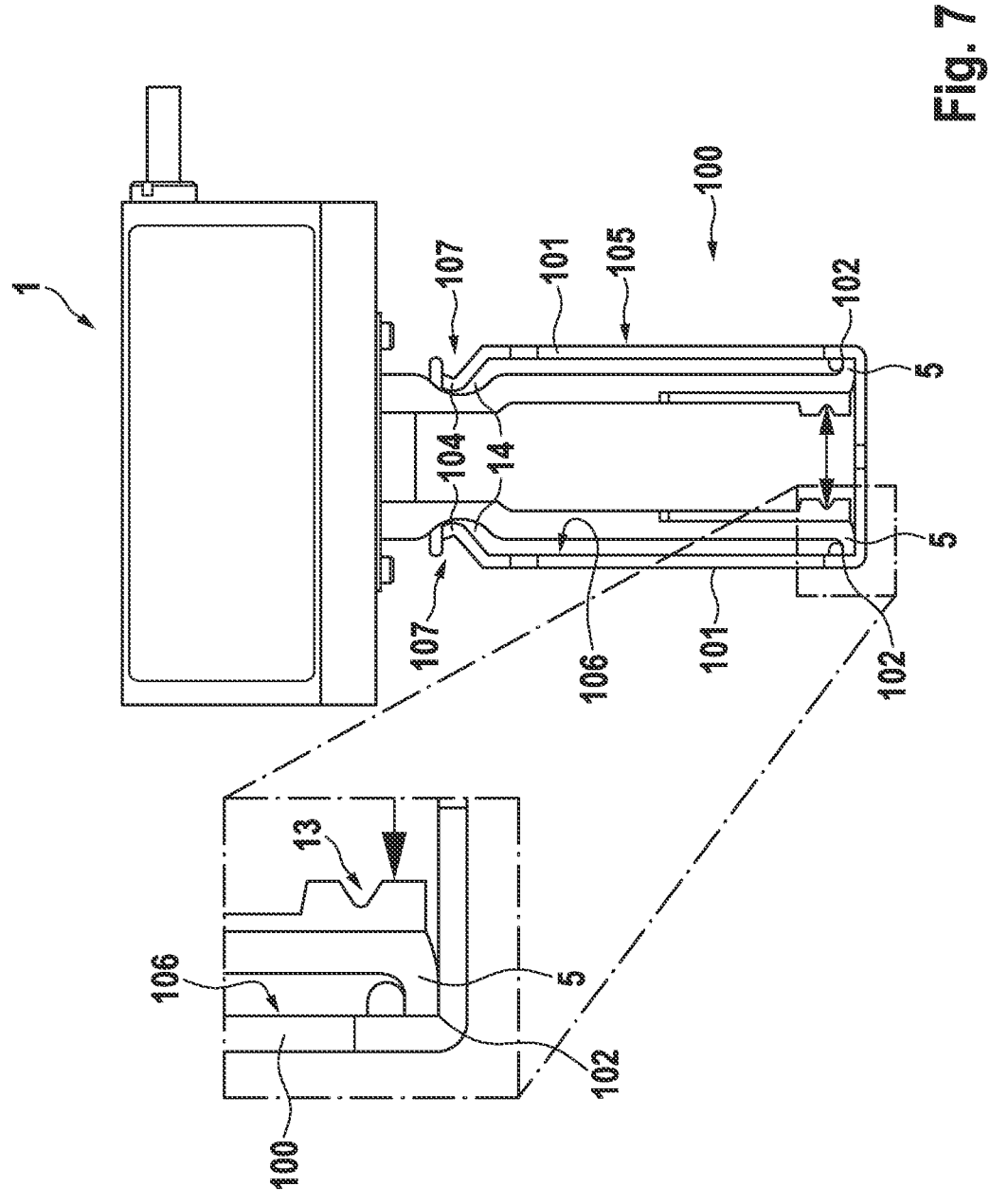
Figure 8:
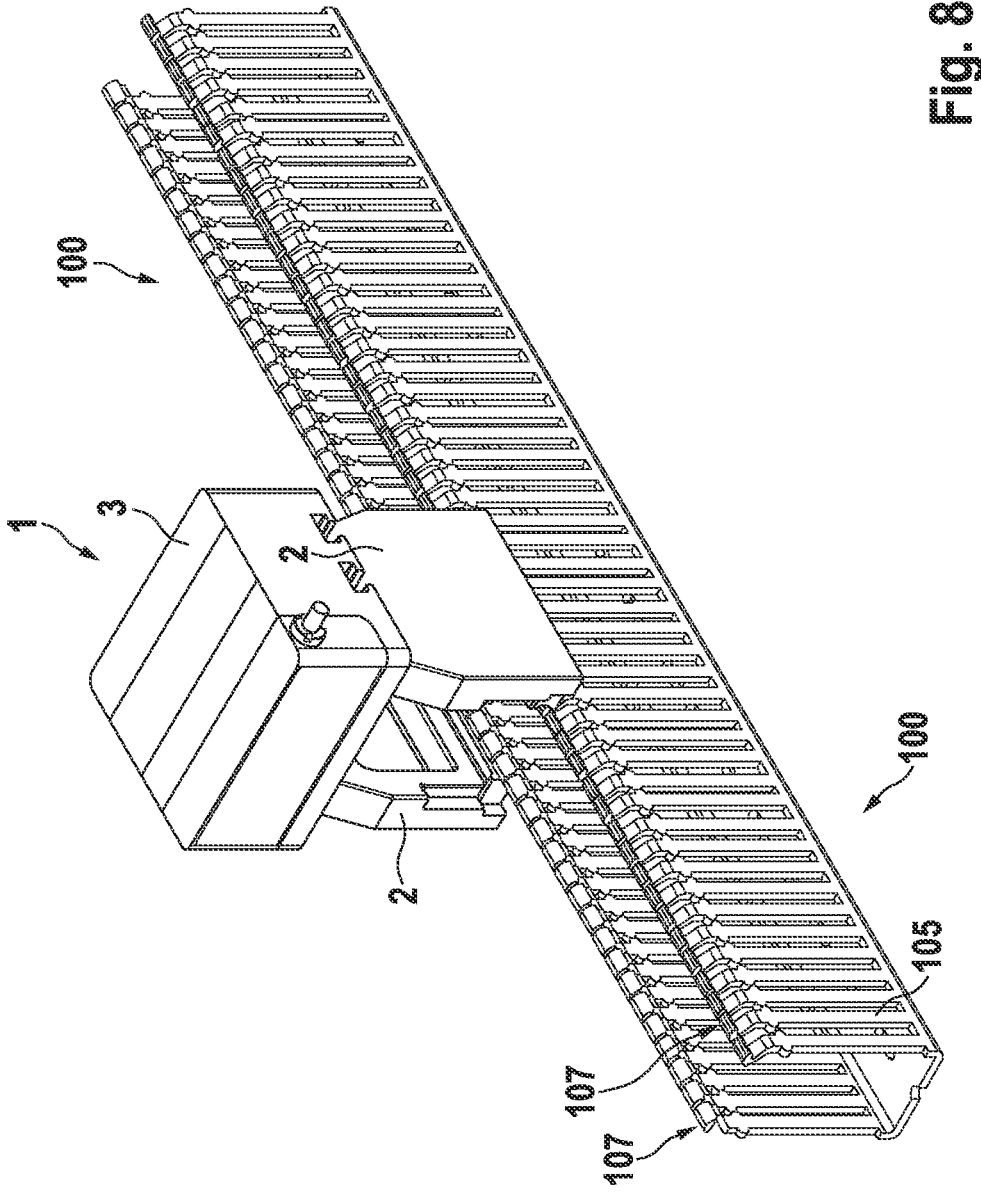
Figure 9:
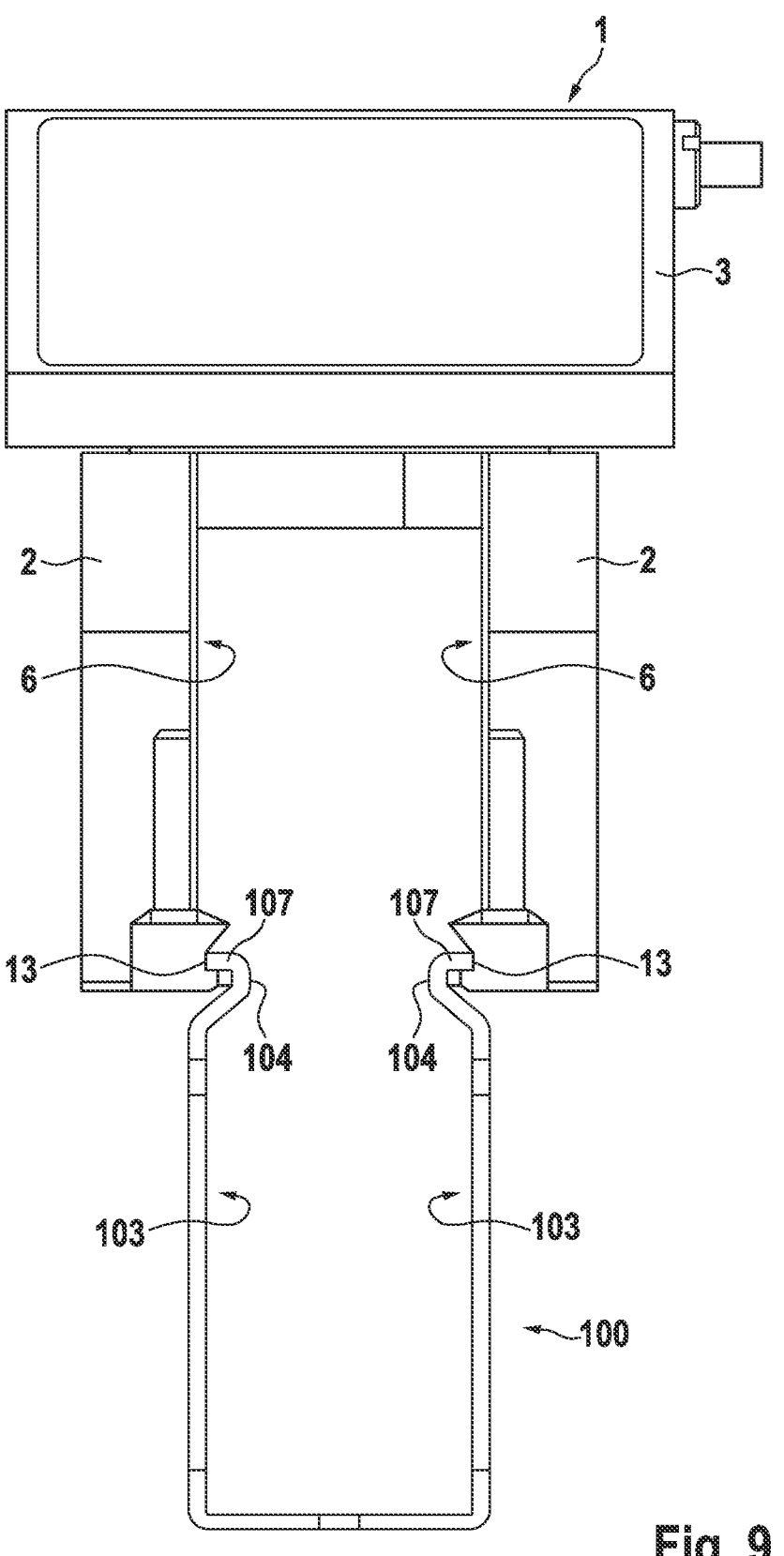
Figure 10:
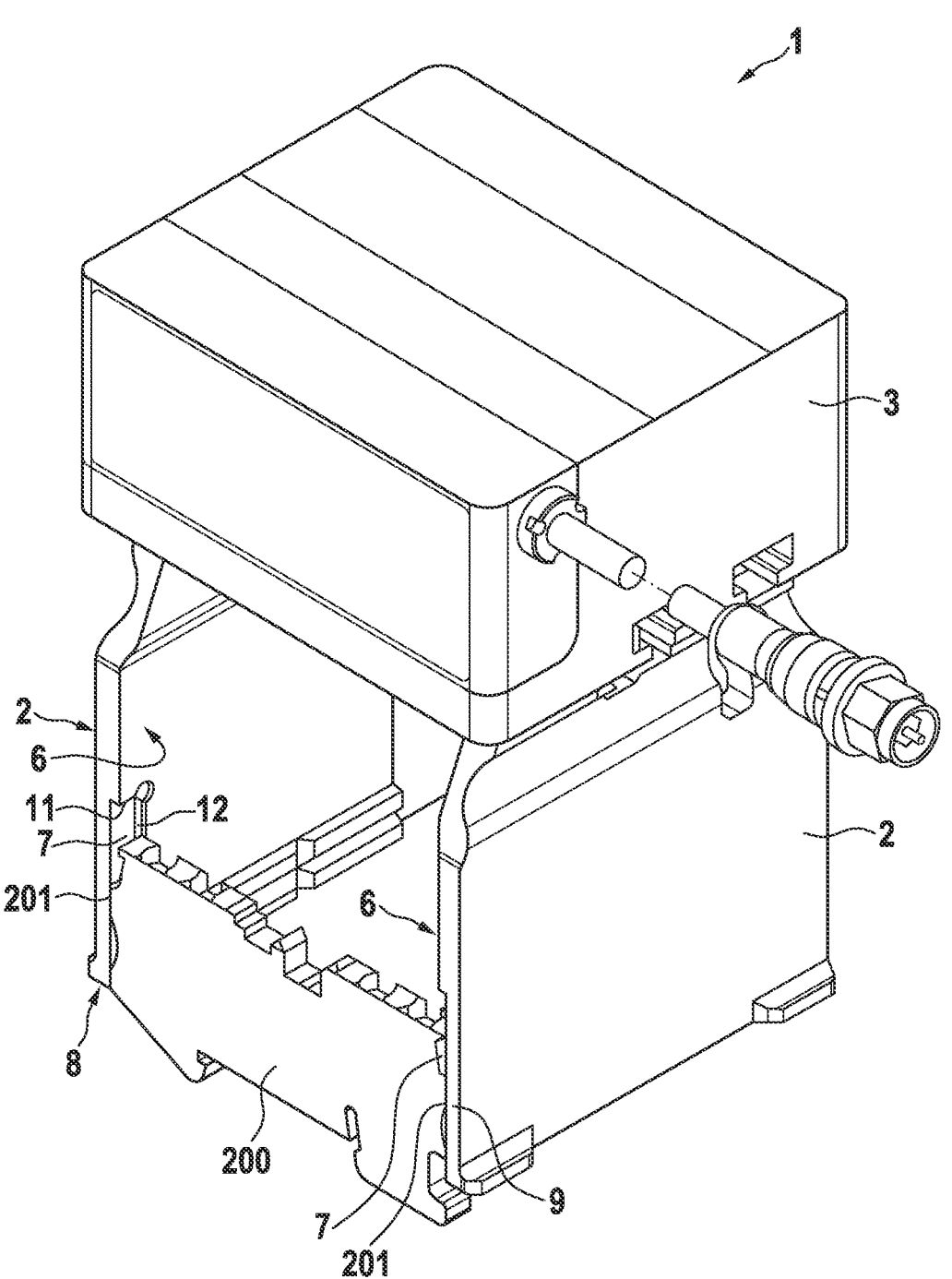
Figure 11:
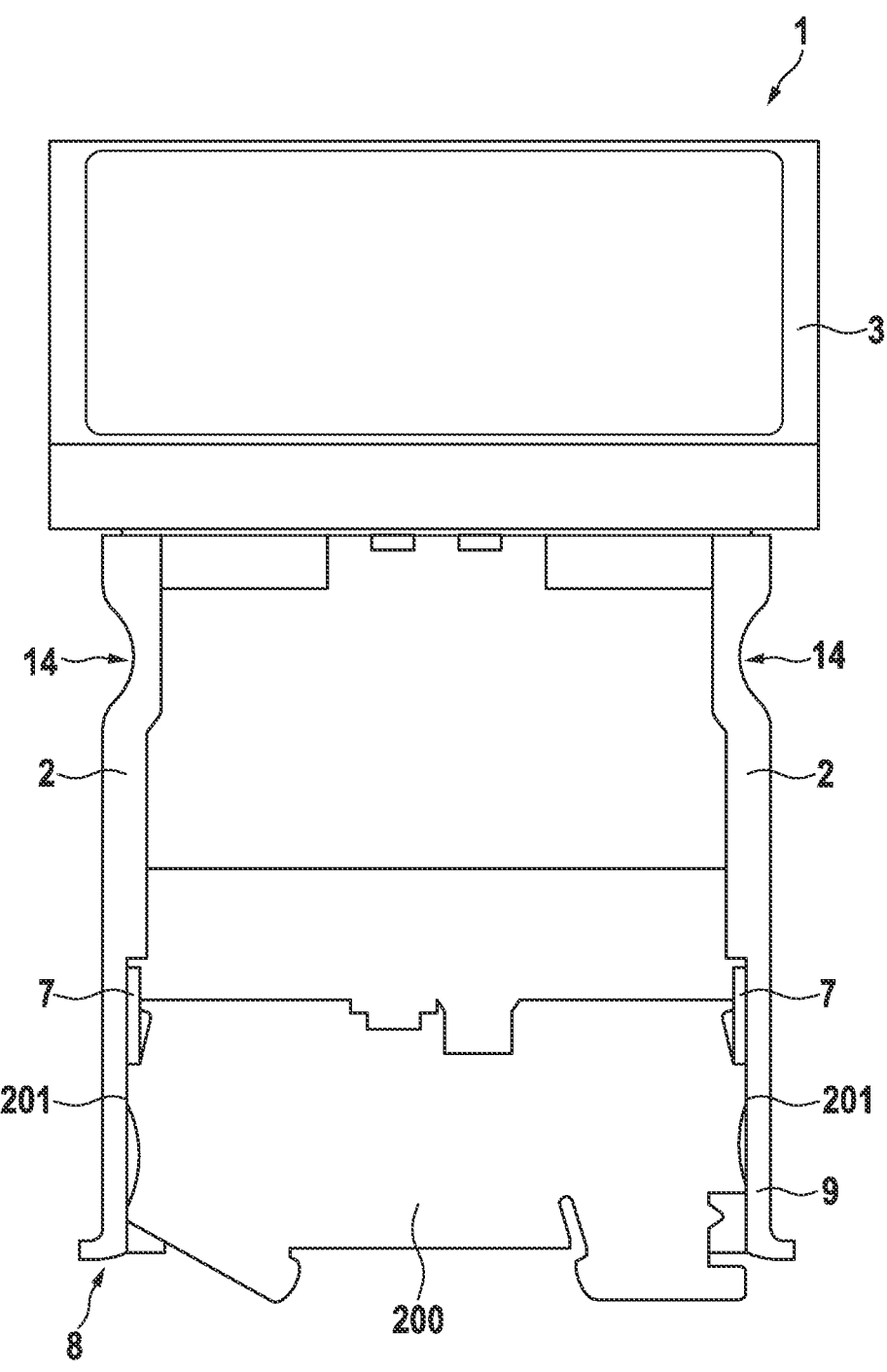

Further details of the invention are explained with reference to the figures below. Thereby shows:

FIG. 1 a perspective view of an exemplary embodiment of a gripper arrangement according to the invention;

FIG. 2 a side view of the gripper arrangement according to FIG. 1;

FIG. 3 a perspective view of the underside of the gripper assembly according to FIGS. 1 and 2;

FIG. 4 a perspective view of a further embodiment of a gripper arrangement according to the invention;

FIG. 5 a side view of the gripper arrangement according to FIG. 4;

FIG. 6 a perspective view of another embodiment of the gripper arrangement according to the invention with a cable duct;

FIG. 7 a side view with detailed view of the embodiment according to FIG. 6;

FIG. 8 a perspective view of another embodiment of the gripper arrangement according to the invention with a cable duct;

FIG. 9 a side view of the embodiment according to FIG. 8;

FIG. 10 another perspective view of a gripper arrangement according to the invention with a terminal block;

FIG. 11 a side view of the embodiment according to FIG. 10.

DETAILED DESCRIPTION

Example embodiments will now be described more fully with reference to the accompanying drawings.

FIGS. 1 to 3 show a first embodiment of a gripper arrangement 1 according to the invention for component placement on mounting plates in switchgear and control system construction. The gripper arrangement 1 essentially comprises two gripper jaws 2, the distance between which can be varied via the linear adjusting unit 3 in order to clamp components between the gripper jaws or, as is in particular also possible according to the invention, to fix a component, preferably a flexible component, at two opposite inner sides of the component via the outer sides 4 of the gripper jaws 2 facing away from each other.

Particularly for stabilizing flexurally limp components, the gripper jaws 2 are plate-shaped and thus provide a comparatively large contact surface for flexurally limp components, which are thereby stabilized. The flexurally limp component can, for example, be a cable duct with a rectangular cross-section and removable cover, the opposing parallel sidewalls of which are formed by a plurality of elastic fingers arranged next to one another. Such a cable duct is shown, for example, in FIG. 6.

The gripper jaws have a thickness d in the direction of displacement x of the gripper jaws 2 relative to each other, which in the present case is less than $\frac{1}{10}$ of both the width b and the height h of the gripper jaws 2. This allows the gripper jaws 2 to form a compact unit in a fully collapsed state in which the gripper jaws 2 are maximally approached to each other, the thickness of which is approximately twice the thickness d or slightly more. This makes it possible for the gripper jaws 2 to also dip into comparatively compactly constructed components, in particular flexible components such as cable ducts of the type described above with a small cross-section, and to secure them in the manner described above by clamping them over the opposing outer sides 4 of the gripper jaws 2.

The gripper jaws 2 each have two recesses 7 of different geometry on their inner side 6 to enable the clamping of components with differently shaped end sides. The recesses 7 are open towards the end face 8 and towards the longitudinal side 9 of the gripper jaw 2 in order to promote simple and positionally secure insertion of the component between the gripper jaws 2. The recesses 7 are arranged in a lower corner region 10 of the gripper jaws 2 and the openings to the end face 8 and the longitudinal side 9 merge into one another in the corner region 10, so that insertion of a component into the recess 7 is possible by sliding into it.

To enable precise arrangement of the component between the gripper jaws 2, which is absolutely necessary for reproducible arrangement of the components in the context of switchgear and control system construction, the recesses 7 have two stops 11, 12, which are formed straight by two edges of the recesses 7 that are perpendicular to each other. The two stops 11, 12 are perpendicular to each other and extend parallel to and at a distance from the longitudinal side 9 and the end face 8 of the gripper jaw 2, respectively.

FIGS. 10 and 11 show an embodiment in which a placement component 200, which is a terminal block, is received via its opposing outer sides 210 in a respective one of two opposing recesses 7 on the inner sides 6 of the opposing jaws 2. It can further be seen that the row clamp 200 merely abuts the vertical stop 12 and is spaced from the horizontal stop 11. It can further be seen that the placement component 200 protrudes from the recesses 7 with its end sides 201 engaging in the recesses 7 over the end faces 8 of the gripper jaw 2, while the outer flat side wall of the placement component 200 connecting the end sides 201 is aligned with the longitudinal sides 9 of the gripper jaw 2.

In the embodiment shown in FIGS. 4 and 5, the gripper jaws 2 have a groove 13 on their inner sides 6 facing the respective opposite gripper jaw 2, which groove extends along the end face 8 of the gripper jaw 2. The gripper arrangement 1 further has a rail-shaped placement component, which in the present case is designed as a top-hat rail-shaped mounting rail 202, which engages with its mutually remote parallel longitudinal edges 203 in a respective one of the grooves 13 on the opposing and mutually facing inner sides 6 of the gripper jaws 2 and can thus be clamped in a fixed position between the gripper jaws 2.

The embodiment shown in FIGS. 6 and 7 illustrates a gripper arrangement 1 in which the gripper jaws 2 engage over substantially their entire height with the placement component 100, which in the present case is formed as a cable duct with the cover removed (not shown). The cable channel 100 has parallel longitudinal sides 106 formed by a plurality of fingers 105 extending from the bottom of the cable channel 100. The fingers 105 have a bead-like contour 104 at their free end on the inner side 103 of the cable duct 100. The gripper jaws 2 dip into the cable duct 100 from the upper side of the cable duct 100, so that the fingers 105 engage with the bead-shaped contour 104 in the troughs 14 on the outer sides 4 of the gripper jaws 2 facing away from each other, whereby the unstable free ends of the fingers 105 undergo stabilization. Further fixation of the gripper jaws 2 with respect to the cable duct 100 is achieved by the gripper jaws 2 engaging with their end projections 5 on the outer sides 4 facing away from each other in a groove 102 on the bottom side.

Deviating from the embodiment shown in FIGS. 6 and 7, in the embodiment according to FIGS. 8 and 9, it is provided that the gripper jaws 2, when maneuvering a cable duct 100, exclusively engage the upper free and parallel longitudinal edges 107 at the ends of the fingers 105, whereby an elastic deformation of the fingers 105 occurs in order to establish the necessary frictional connection between the gripper jaws 2 and the fingers 105 of the cable duct 100. This type of maneuvering is also made possible by the fact that the gripper jaws 2 are plate-shaped and thus provide a comparatively large contact surface of the gripper jaws 2 against the ends of the fingers 105.

The features of the invention disclosed in the foregoing description, in the drawings as well as in the claims may be essential to the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A gripper arrangement for component placement on mounting plates in switchgear and control system manufacturing, the gripper arrangement comprising a first plate-shaped gripper jaw having a thickness, a height and a width, the thickness of the first gripper jaw being smaller than the height and width of the first gripper jaw;

a second plate-shaped gripper jaw having a thickness, a height and a width, the thickness of the second gripper jaw being smaller than the height and width of the second gripper jaw;

a linear adjusting unit for moving the first gripper jaw and second gripper jaw relative to each other;

the first and second gripper jaws each having a least one projection at an end thereof on outer sides thereof facing away from each other; and the first gripper jaw or second gripper jaw having a recess on an inner portion thereof facing the other gripper jaw, the recess being open at an end face of the jaw and running towards the linear adjusting unit.

2. The gripper arrangement according to claim 1, wherein the thickness is less than one fifth of at least one of the height and width.

3. The gripper arrangement according to claim 1, which further comprises a cable duct which has a respective longitudinal groove on a bottom portion on its opposite inner-side longitudinal sides, wherein the gripper jaws dip into the cable duct from an upper side of the cable duct and engage in the longitudinal grooves with said projections.

4. The gripper assembly according to claim 1, wherein both the first gripper jaw and second gripper jaw have said recess.

5. The gripper arrangement according to claim 4, in which the recess opens into an end corner of the upper jaw and, in a region of the corner, it is open without interruption both to the end corner and to the longitudinal side of the gripper job.

6. The gripper assembly according to claim 4, further comprising a placement component which engages with at least one of its opposite end sides in the recess of at least one of the gripper jaws.

7. The gripper arrangement according to claim 6, in which the placement component protrudes from the recess with its end side engaging in the recess beyond the end face and/or the longitudinal side of the gripper jaw.

8. The gripper arrangement according to claim 6, in which the placement component rests against at least one stop formed by a rim of the recess, the recess having a rim extending in the width direction of the gripper jaw and forming a height stop and/or a rim extending in the height direction and forming a side stop.

9. The gripper assembly according to claim 1, wherein the gripper jaws have at least one pair of opposing identical recesses on their inner sides facing the respective opposing gripper jaw.

10. The gripper arrangement according to claim 1, in which at least one of the gripper jaws has, on its inner side facing the respective opposite gripper jaw, a groove which extends along an end face of the gripper jaw.

11. The gripper arrangement according to claim 10, in which the groove opens into a recess on an inner side of the gripper jaw facing the respective opposite gripper jaw.

12. The gripper assembly according to claim 10, further comprising a channel- or rail-shaped placement component which engages with longitudinal edges facing away from and parallel to each other in a respective groove on the opposing and facing inner sides of the gripper jaws.

13. The gripper arrangement according to claim 1, in which the gripper jaws have, at their end facing the linear adjusting unit, on their outer sides facing away from one another, a trough having a geometry of a concave groove and extending along the width of the respective gripper jaw.

14. The gripper assembly according to claim 13, further comprising a cable duct whose parallel longitudinal sides are formed by a plurality of fingers extending from a bottom of the cable duct and having a bead-shaped contour at their free end on an inner side of the cable duct, wherein the gripper jaws dip into the cable duct from an upper side of the cable duct and the fingers engage in troughs on the outer sides of the gripper jaws facing away from each other.

\* \* \* \* \*